Figure 1:
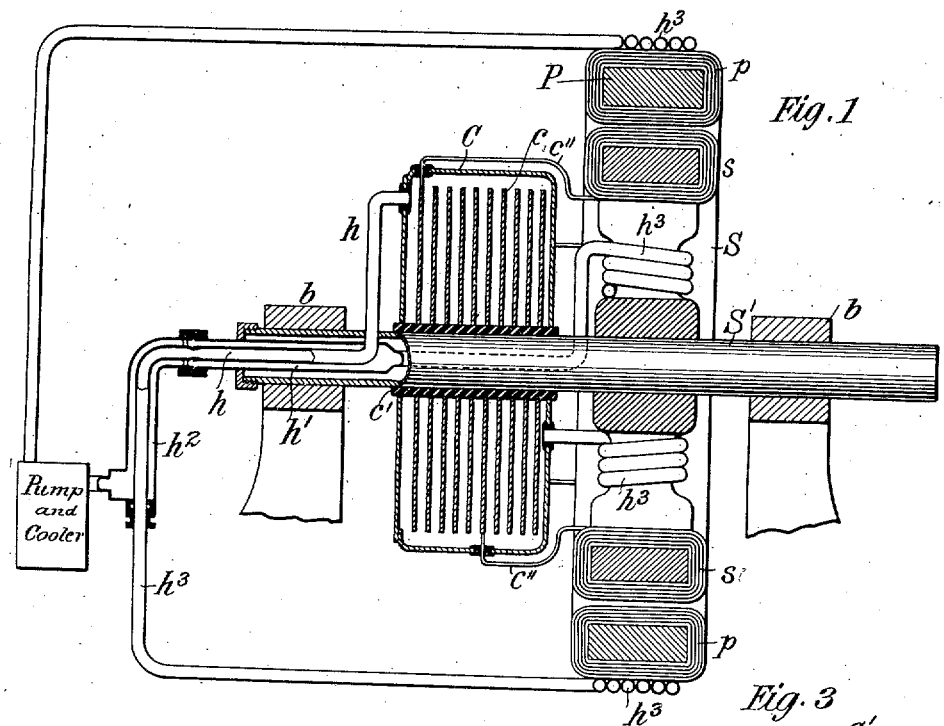

No. 853,465. PATENTED MAY 14, 1907.
R. D. MERSHON.
INDUCTION MOTOR AND GENERATOR.
APPLICATION FILED MAY 28, 1906.

3 SHEETS—SHEET 2.

Witnesses
Raphael Setter
S. S. Dunham.

Ralph D. Mershon, Inventor

By his Attorneys
Kerr, Page & Cooper

No. 853,465. PATENTED MAY 14, 1907.
R. D. MERSHON.
INDUCTION MOTOR AND GENERATOR.
APPLICATION FILED MAY 28, 1906.

3 SHEETS—SHEET 3.

Witnesses
Raphaël Netter
A. S. Dunham

Ralph D. Mershon, Inventor
By his Attorneys
Kerr, Page & Cooper

UNITED STATES PATENT OFFICE.

RALPH D. MERSHON, OF NEW YORK, N. Y.

INDUCTION-MOTOR AND GENERATOR.

No. 853,465.  Specification of Letters Patent.  Patented May 14, 1907.

Application filed May 28, 1906. Serial No. 319,096.

*To all whom it may concern:*

Be it known that I, RALPH D. MERSHON, a citizen of the United States, residing at New York, in the county and State of New York, have invented certain new and useful Improvements in Induction-Motors and Generators, of which the following is a specification, reference being had to the drawings accompanying and forming part of the same.

In a copending application, Serial No. 257,991, filed April 29, 1905, I have described and claimed broadly a plan for improving the operation of induction motors and generators, of which plan an important feature is the employment of an electrolytic condenser or condensers in the secondary winding or windings. The scheme described in the said application will answer with the ordinary condenser, but in such case, in order that the condenser shall not be objectionably large and costly the secondary of the machine will have to be wound for a higher voltage than would otherwise be desirable. This is not true, however, with a condenser of the electrolytic type, since such a condenser is inherently one demanding a comparatively low voltage; that is, the various elements of the condenser are operative effectively for comparatively low voltage, and that very much lower than is ordinarily desirable for the usual form of condenser. The usual form of electrolytic condenser has in it a very high loss. In other words its efficiency is low, which makes its use objectionable in many cases where it would be desirable by reason of its cheapness or other good qualities. When used in the secondary of an induction motor, however, this characteristic of the electrolytic condenser is no longer objectionable, but is rather an advantage in that it is desirable to obtain in the secondary of an induction motor, under given conditions, as high a loss as possible. We are not, however, confined to the use of low voltage with such a condenser; since by putting the necessary number of elements in series a condenser may, if desired, be obtained which is operative at high voltage.

Since the ordinary condenser preferably has a comparatively high voltage, it is usually necessary, where such a condenser is used, to wind the secondary for a higher voltage than otherwise would be desirable or required, thus making the machine more bulky and very materially increasing its cost. But by reason of the fact that the electrolytic condenser is effectively operative at low voltage the secondary, with such a condenser, need not be wound for a higher voltage than that demanded by other conditions under which the machine is designed to be used. The electrolytic condenser may even be used with a squirrel cage winding, or bar winding similar thereto, a type of winding which is for certain purposes especially advantageous. In any case the condenser may be in parallel with inductance, or resistance, or both, or may be on a separate winding of its own. Where desirable there may even be three sets of windings on the secondary element,—one for use in connection with the condensers, one for the resistances, and one for the inductances. All of these arrangements are fully described and claimed broadly in my application above identified.

My present invention relates to the foregoing scheme, and has for its object to provide a machine in which the electrolytic condenser is mounted in, on, or alongside of the secondary when the latter is the rotating element. This arrangement possesses a number of structural advantages, particularly in the case of a machine in which the number of poles is variable. These advantages will be more fully pointed out hereinafter.

In view of the well known reversibility of the induction motor, in that when driven above synchronism it will act as a generator and deliver power to the circuit to which it may be connected, the following description will, for the sake of brevity and simplicity, be confined to the motor; but it will be recognized by those skilled in the art that the invention is applicable to generators as well.

In carrying out my invention in its preferred form in a machine in which the secondary is the rotating element, I mount the electrolytic condenser alongside of the secondary on the same shaft, and connect the condenser directly with the secondary winding by taps brought out through the condenser casing. By thus making the condenser practically a part of the rotating element the use of slip rings, to connect the two electrically, may be avoided. In the case of a motor adapted for speed control by variation in the number of its poles the use of a stationary condenser involves the use of a large number of slip rings; but with my invention the number of slip rings may be largely reduced, or eliminated entirely if desired.

Figure 2:
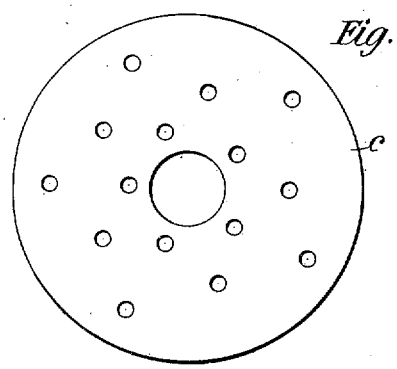
Figure 3:
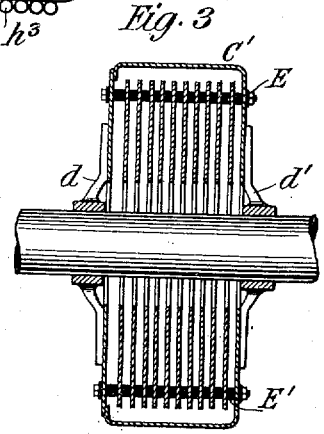
Figure 4:
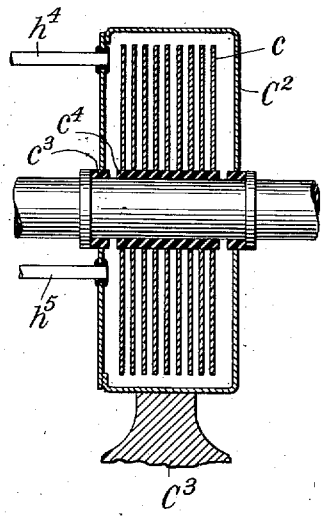
Figure 5:
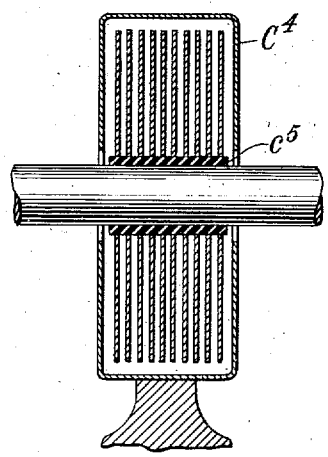
Figure 6:
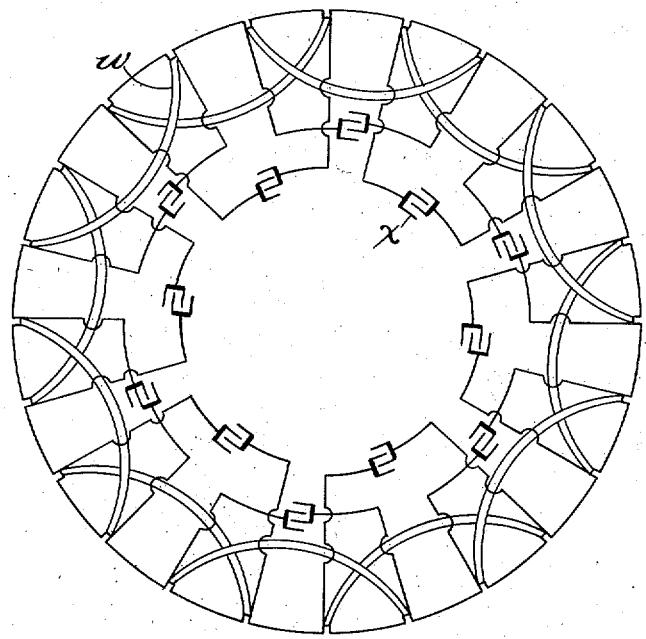
Figure 7:
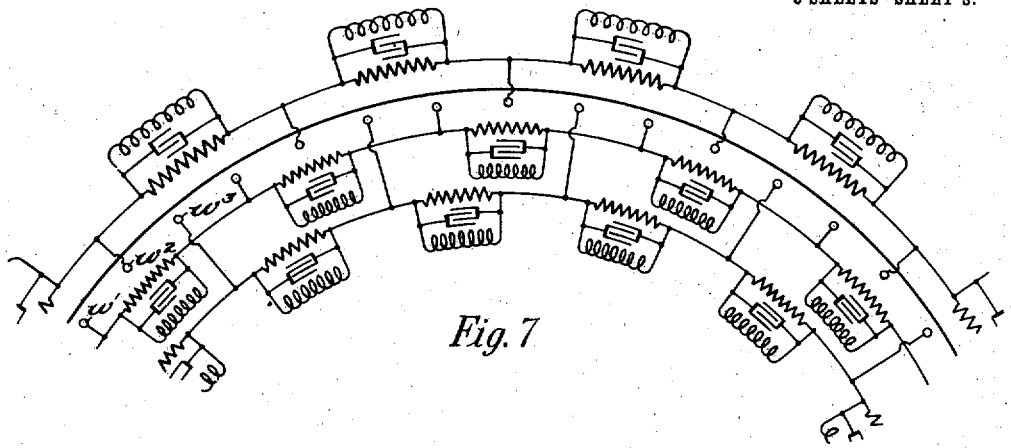
Figure 8:
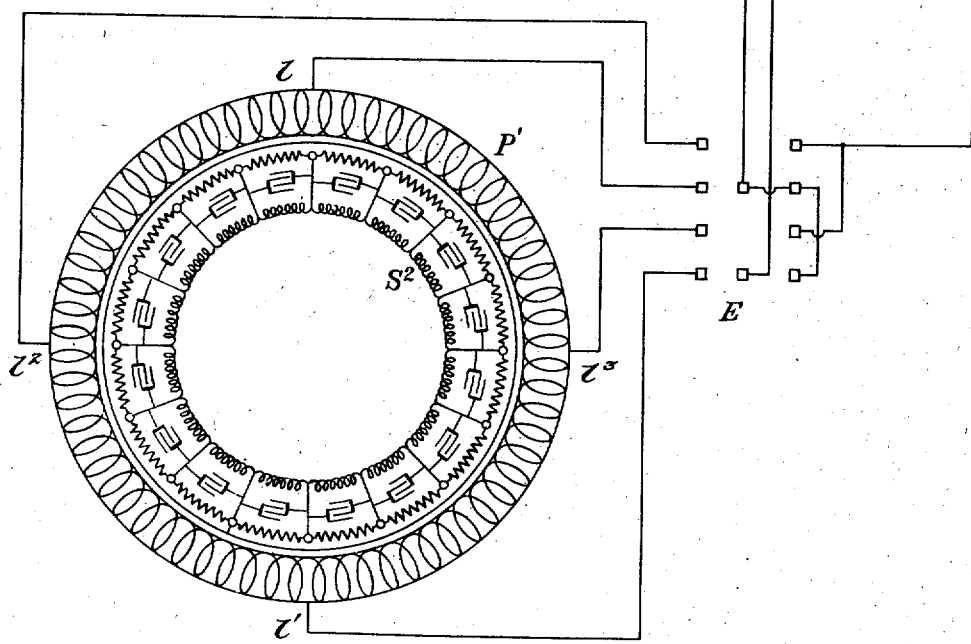

The preferred form of the invention is illustrated, somewhat diagrammatically, in the annexed drawings, in which Figure 1 is a vertical longitudinal section of a motor, showing the stationary primary and rotating secondary, both of the Gramme ring type, and an electrolytic condenser mounted on the same shaft as the secondary. This figure also shows a system of piping for circulating the electrolyte through the condenser and around the primary and secondary elements, to cool the same. Fig. 2 shows a desirable form of condenser element, provided with perforations to permit free circulation of the electrolyte. Fig. 3 shows another plan of mounting the condenser, leaving the interior open to the atmosphere, so that the electrolyte will be in contact with the air and thus give an opportunity to be cooled by radiation, convection, evaporation, etc. Figs. 4 and 5 show modifications of Figs. 1 and 3 respectively. Fig. 6 is a diagrammatic end view of a secondary with a drum winding, showing the invention applied thereto. Fig. 7 is a diagram showing one of many possible plans for connecting the condenser, and also resistances and inductances, with the secondary windings. Fig. 8 is a diagram showing a motor adapted for speed control by variation in the number of its poles, with condensers, resistances, and inductances in the secondary.

Referring now more particularly to Fig. 1, P indicates the primary element, in the present instance one of the Gramme ring type. The secondary, of the same type, is indicated at S. The secondary is mounted on a shaft S', rotating in suitable bearings $b$.

The electrolytic condenser is mounted on the shaft S', alongside of the secondary, and consists of an outer cylindrical casing C, inclosing a series of plates or electrodes $c$, preferably, but not necessarily of circular form and concentrically arranged. The whole is insulated from the shaft by a sleeve $c'$ of suitable insulating material. The condenser electrodes are of metal, and the electrolyte is one of the numerous solutions suitable for the purpose. For instance, the electrodes may be of aluminium and the electrolyte a solution of borax.

The condenser plates are connected with the secondary coils by taps as $c''$, brought out through openings in the condenser casing C, for example in the peripheral surface thereof, or through the shaft, and connected to the secondary winding or windings at the proper points.

For the purpose of preventing overheating of the condenser, provision is made for circulating the liquid electrolyte through the plates, as shown in Fig. 1. The shaft S' is hollow, to accommodate pipes $h$, $h'$. The pipe $h$ communicates with the interior of the condenser at one or more points near its periphery, while the other pipe, $h'$, opens into the condenser near the axis of the same at one or more points. At the end of the shaft the two pipes are connected to conduits $h^2$, $h^3$, by any suitable coupling to permit rotation of the shaft. The conduits $h^2$, $h^3$, are connected with any suitable pumping and cooling apparatus or other circulating means, merely indicated at H, so that the electrolyte can be cooled and forced positively through the condenser. If desired the conduit $h^3$ can be led to the primary and disposed in any suitable way, as coiling it thereon, to cool the same, while the pipe $h$ may be similarly disposed in the secondary element. In order to facilitate the circulation of the liquid through the condenser the plates or electrodes may be perforated, as shown in Fig. 2. In Fig. 1 the electrolyte flows first around the primary and secondary elements before entering the condenser, but it is clear that the system of piping may be arranged to deliver the liquid first to the condenser, or in any other way, as desired.

In the form shown in Fig. 3, no liquid circulating system is employed. The casing C' is provided with enlarged openings through which the shaft passes, and the casing is carried by suitable spiders $d$ $d$. The electrodes are provided with similar openings, and are supported by insulating rods E E'. In this form of condenser the amount of liquid electrolyte employed must be considerably less than in the case first described, so that when the motor is at rest the electrolyte will not overflow the casing through the shaft openings. When the condenser is rotating the electrolyte is distributed around the condenser of the same by the influence of centrifugal force, as will be readily understood. The air thus having free access to the interior of the condenser, the latter may be cooled by radiation, convection, evaporation of the electrolyte, etc. In this arrangement the taps from the condenser may be brought out through the shaft opening or through other openings in the casing, as desired.

Whenever desirable, fresh electrolyte may be added in any suitable way, to take the place of that lost by evaporation or otherwise and thus keep a proper amount in the condenser. It is clear that the more electrolyte there is in the condenser the greater will be the amount of electrode surface covered by the electrolyte, and consequently the greater will be the capacity of the condenser; or conversely the smaller will be the size of the condenser required for a given capacity. In this respect, in addition to the capability of circulation of the electrolyte, the arrangement first described is preferable, inasmuch as the casing may be completely filled with the electrolyte and hence, the plates being thus entirely submerged, the maximum capacity of the condenser is obtained. It is of course clear that the capacity of the condenser in both arrangements, Fig. 1 and Fig. 3, may be varied by varying the quantity of electrolyte in the casing.

If desired, the casing of the condenser may be stationary, while the plates or electrodes rotate inside the same with the shaft. This plan as applied to the construction shown in Fig. 1 is illustrated in Fig. 4: The casing $C^2$ is mounted on any suitable support $C^3$, and is insulated from the rotating shaft by insulating bushings $c^3$ which fit the shaft closely to prevent leakage of the electrolyte. The plates $c$ are secured to an insulating sleeve $c^4$ on the rotating shaft. The electrolyte may be circulated through the device by means of the pipes $h^4$, $h^5$, as will be readily understood. A similar modification of the construction shown in Fig. 3 is illustrated in Fig. 5. Therein, $C^4$ indicates the stationary casing, provided with enlarged shaft openings. The plates or electrodes $c$ are secured to an insulating sleeve $c^5$ on the rotating shaft. The taps from the condenser plates are not shown in Figs. 4 and 5, but it is clear that they may be brought out in any suitable way, as already described in connection with Figs. 1 and 3.

The primary and the secondary of the motor shown in Fig. 1 are of the ring type. The invention is not, however, limited to such type, but may be employed equally well with other forms, for example, drum windings and squirrel cage windings. An instance of the former is shown in Fig. 6, in which $w$ indicates the drum winding and $x$ one of the condensers. Inductances or resistances, or both, may of course be used also, if desired, as shown, for example, in Figs. 7 and 8, described below.

As mentioned above, the electrolytic condenser is well adapted for use with squirrel cage or bar windings, a type which lends itself most readily to speed control by variation of the number of poles in the primary. In my copending application above referred to I have illustrated several arrangements of inductances, condensers, and resistances in the secondary, particularly adapted for change in the number of poles in the primary. One of these arrangements is shown in Fig. 7 in the annexed drawings. Therein it will be seen that there are three sets of overlapping windings, indicated by $w'$, $w^2$, $w^3$, each of which is provided with condensers, inductances, and resistances illustrated by the usual conventional representations. In making the desired connections from a condenser on the secondary shaft, the plates are, by means of the taps brought out from the condenser, connected in sets of two or more between the bars constituting a set of windings, as indicated in Fig. 7, each condenser shown in the latter figure thus being made up of two or more adjacent plate surfaces. In Fig. 8 there is but one set of bars, with the inductances, condensers, and resistances connected between the adjacent bars. The last mentioned figure shows a variable pole motor, adapted to run with two and with four poles, thus giving two synchronous speeds. In this figure G indicates the source of current, which may of course be either single-phase, as shown, or polyphase. $P'$ and $S^2$ are the primary and the secondary respectively, of any suitable kind, as for example the single ring windings shown. E is a diagrammatic controller. By tracing the connections it will be seen that in the first position of the controller two poles will be produced in the primary, the leads therefor being tapped in at $l$ and $l'$. In the next position the number of poles is changed to four, produced by leads $l$, $l'$, $l''$, $l'''$.

While I have shown only a squirrel cage secondary in a variable-pole motor, it is to be understood that the invention is not confined thereto, but may be used in a variable-pole motor having any other type of secondary.

It is clear that to connect the condensers in the secondary windings by means of slip rings in the usual way, even for two and four poles, would make the apparatus extremely complicated. With my present invention, however, the connections may be made simply by bringing out the necessary number of taps from the condenser, the latter being of course provided with the required number of plates or elements, and the use of slip rings between the condenser and the secondary may therefore be entirely avoided.

Only single-phase machines are shown in the various figures, but it will be evident to those skilled in the art that the invention is applicable to polyphase apparatus as well.

What I claim is:

1. In an alternating current machine of the induction type, the combination of a primary element, a rotating secondary element, and a rotating electrolytic condenser or condensers connected with the secondary winding or windings, as set forth.

2. In an alternating current machine of the induction type, the combination of a primary element, a rotating secondary element, a shaft therefor, an electrolytic condenser or condensers mounted on the same shaft and rotating with the secondary element, and connections from the condenser or condensers to the secondary winding or windings, as set forth.

3. In an alternating current machine of the induction type, the combination of a primary element, a rotating secondary element, a plurality of condenser plates or electrodes rotating with the shaft, a casing inclosing the plates and adapted to contain an electrolyte, and connections from the said plates or electrodes to the secondary winding or windings, as set forth.

4. In an alternating current machine of the induction type, the combination of a primary element, a rotating secondary element, a shaft therefor, a casing mounted on the same shaft and rotating therewith and adapted to contain an electrolyte, a plurality of condenser plates or electrodes in the casing, and connections from the condenser plates or electrodes to the secondary winding or windings, as set forth.

5. In an alternating current machine of the induction type, the combination of a primary element, a rotating secondary element, a shaft therefor, a cylindrical casing mounted concentrically on the same shaft alongside of the secondary element, and adapted to contain an electrolyte, a plurality of condenser plates or electrodes in the casing, arranged concentrically about the shaft, and connections from the plates or electrodes to the secondary winding or windings, as set forth.

6. In an alternating current machine of the induction type, the combination of a primary element, a rotating secondary element, a rotating electrolytic condenser or condensers connected with the secondary winding or windings, and means for cooling the condenser or condensers, as set forth.

7. In an alternating current machine of the induction type, the combination of a primary element, a rotating secondary element, a shaft therefor, a plurality of condenser plates or electrodes rotating with the shaft and connected with the secondary winding or windings, a casing inclosing the plates and adapted to contain an electrolyte, and means for circulating the electrolyte through the said casing, as set forth.

8. In an alternating current machine of the induction type, the combination of a primary element, a rotating secondary element, a hollow shaft therefor, a casing through which the shaft extends, adapted to contain an electrolyte, plates or electrodes inside the casing, rotating with shaft and connected with the secondary winding or windings, pipes extending from the casing through the hollow shaft, a rotating coupling on said pipes, and circulating means connected with said pipes through said rotating coupling whereby the electrolyte may be circulated through the casing, as set forth.

9. In an alternating current machine of the induction type, the combination of a primary element, a rotating secondary element, an electrolytic condenser or condensers rotating with the secondary element, and connected with the secondary winding or windings, and means for cooling the condenser or condensers and the primary element, as set forth.

10. In an alternating current machine of the induction type, the combination of a primary element, a rotating secondary element, an electrolytic condenser or condensers rotating with the secondary element and connected with the winding or windings thereof, and means for cooling the condenser or condensers, the primary element and the secondary element, as set forth.

11. In an alternating current machine of the induction type, the combination of a primary element, a rotating secondary element, an electrolytic condenser or condensers rotating with the secondary element and connected with the winding or windings thereof, and means for circulating the electrolyte through the condenser or condensers, the primary and the secondary elements, as set forth.

12. In an alternating current machine of the induction type, the combination of a primary element, a rotating secondary element, an electrolytic condenser or condensers rotating with the secondary element and connected with the winding or windings thereof, and means for varying the number of poles in the primary element, as set forth.

13. In an alternating current machine of the induction type, the combination of a primary element, a rotating secondary element, an electrolytic condenser or condensers rotating with the secondary element, and having connections direct from the condenser or condensers to the secondary winding or windings, and means for varying the number of poles in the primary element, as set forth.

14. In an alternating current machine of the induction type, the combination of a primary element, a rotating secondary element, and electrolytic condenser or condensers rotating with the secondary element on the same shaft and provided with a cylindrical casing, connections from the condenser elements to the secondary winding or windings, and means for varying the number of poles in the primary element, as set forth.

RALPH D. MERSHON.

Witnesses:
M. LAWSON DYER,
S. S. DUNHAM